United States Patent Office.

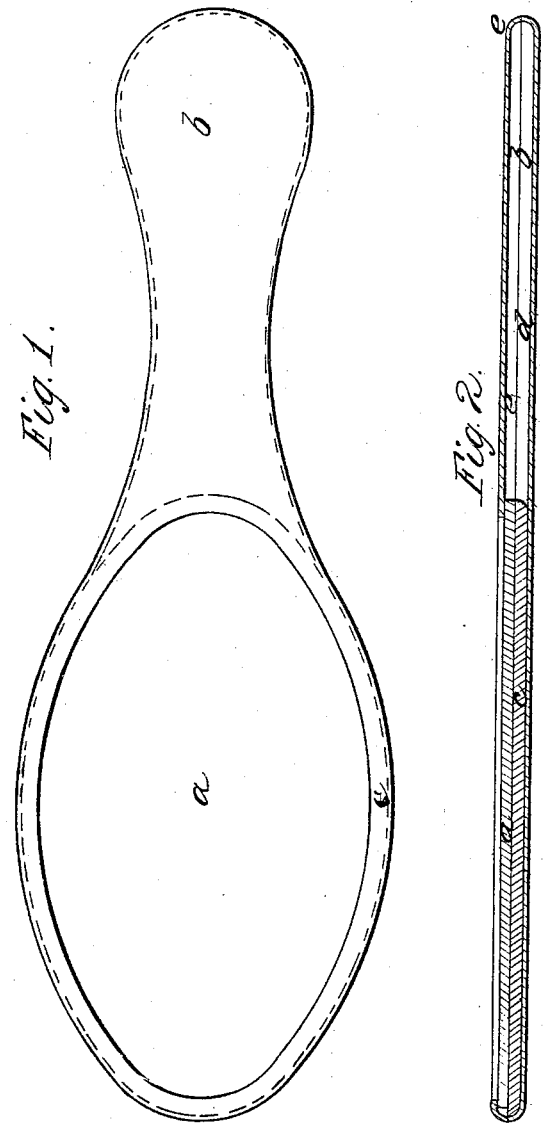

GEORGE WATTIS, OF NEW YORK, N. Y.

Letters Patent No. 94,798, dated September 14, 1869.

IMPROVED TOILET-MIRROR.

The Schedule referred to in these Letters Patent and making part of the same.

Be it known that I, GEORGE WATTIS, of No. 25 Second Avenue, in the city, county, and State of New York, have invented a new and useful Improvement in Toilet-Mirrors; and I do hereby declare that the following is a full, clear, and exact description of the same, reference being had to the accompanying drawings, forming part of this specification, in which—

Figure 1 is a front view of the toilet-mirror when finished.

Figure 2 is a longitudinal section through the centre, showing the invention in a clear and distinct manner.

Similar letters of reference indicate corresponding parts in the figures.

The nature of my invention consists in making the casing of a toilet-mirror of thin sheet-metal, and in two parts, each part being stamped by a proper die into its peculiar shape, both parts being united afterward by solder.

The object of this invention is to produce a light, strong, and durable casing for a toilet-mirror, being not liable to crack or warp, as is the case with toilet-mirrors where the casing is made entirely of wood.

By this way, the looking-glass, inserted into the casing, is also better protected, being firmly and substantially enclosed, and therefore prevented from getting loose in the casing.

To enable others skilled in the art to make and apply my invention, I will proceed to describe its construction.

As above said, the casing of the mirror $a$, including the handle $b$, is made in two parts, formed to their shape by proper dies.

In the lower part, $d$, is laid a thin piece of wood, $c$, of the shape of the mirror $a$.

This piece of wood $c$ serves as a back for the mirror $a$, which is laid on top of it, and held in its place by the upper part, $e$, of the casing, both parts being then soldered firmly together, thus making one solid, light, and durable casing.

It may then be painted and varnished to suit any taste in the market.

What I claim as my invention, and desire to secure by Letters Patent, is—

Making the casing of a toilet-mirror, including the handle $b$, of thin sheet-metal, and in two parts, $d$ and $e$, which are soldered together, as described, as a new and improved article of manufacture.

GEORGE WATTIS.

Witnesses:
JOSEPH B. WRIGHT,
EDWD. WATTIS, Senr.